United States Patent
Jordan

(10) Patent No.: US 8,136,484 B2
(45) Date of Patent: Mar. 20, 2012

(54) TURF IRRIGATION SYSTEM

(75) Inventor: B. Delano Jordan, Silver Spring, MD (US)

(73) Assignee: Benivoli, LLC, Colesville, MD (US)

( * ) Notice: Subject to any disclaimer, the term of this patent is extended or adjusted under 35 U.S.C. 154(b) by 0 days.

(21) Appl. No.: 13/028,512

(22) Filed: Feb. 16, 2011

(65) Prior Publication Data

US 2011/0147480 A1 Jun. 23, 2011

Related U.S. Application Data

(62) Division of application No. 12/271,895, filed on Nov. 15, 2008, now Pat. No. 7,913,653.

(60) Provisional application No. 60/988,431, filed on Nov. 16, 2007.

(51) Int. Cl.
*A01K 27/00* (2006.01)
*A01K 29/00* (2006.01)

(52) U.S. Cl. ........................................ 119/859

(58) Field of Classification Search .................. 119/72, 119/69.5, 666, 163, 718, 860, 161, 712, 719, 119/721, 713, 720; 239/16, 17, 24
See application file for complete search history.

(56) References Cited

U.S. PATENT DOCUMENTS

| | | | | | |
|---|---|---|---|---|---|
| 4,627,385 | A | * | 12/1986 | Vinci | 119/718 |
| 5,009,192 | A | * | 4/1991 | Burman | 119/720 |
| 5,458,093 | A | * | 10/1995 | MacMillan | 119/720 |
| 5,501,179 | A | * | 3/1996 | Cory | 119/712 |
| 5,603,287 | A | * | 2/1997 | Houck | 119/719 |
| 6,158,392 | A | * | 12/2000 | Andre et al. | 119/721 |
| 6,202,594 | B1 | * | 3/2001 | Kirschner | 119/72 |
| 6,651,592 | B2 | * | 11/2003 | Maddox et al. | 119/720 |
| 6,700,486 | B1 | * | 3/2004 | Banki | 340/541 |
| 2008/0033601 | A1 | * | 2/2008 | Habing | 700/284 |

* cited by examiner

*Primary Examiner* — Kristen Hayes
(74) *Attorney, Agent, or Firm* — Jordan IP Law, PC

(57) ABSTRACT

An irrigation system has a water distribution system, a controller, and a pet monitoring system. The controller may modify an irrigation setting of the water distribution system based on a pet elimination signal from the pet monitoring system. The pet elimination signal may correspond to an event such as a pet urination event.

4 Claims, 11 Drawing Sheets

TURF IRRIGATION SYSTEM

CROSS-REFERENCE TO RELATED APPLICATIONS

This application is a divisional of U.S. patent application Ser. No. 12/271,895, filed on Nov. 15, 2008, now U.S. Pat. No. 7,913,653, which claims the benefit of priority to U.S. Provisional Application Ser. No. 60/988,431, filed on Nov. 16, 2007, incorporated herein in their entireties by reference. This application is also related to U.S. patent application Ser. No. 12/714,603, filed on Mar. 1, 2010, which claims the benefit of priority to U.S. Provisional Application No. 61/156,778, filed on Mar. 2, 2009.

BACKGROUND

1. Technical Field

Embodiments of the invention generally relate to water conservation-friendly lawn care systems. More particularly, embodiments of the invention relate to irrigation systems that are responsive to the detection of pet elimination events.

2. Discussion

The ability to maintain a green and healthy lawn has been an important goal in residential as well as commercial settings for many years, and particularly in times of heightened water conservation. Indeed, while there may have been much focus on improving lawn fertilization, seeding and irrigation techniques, there remains substantial room for improvement. A particular area of concern relates to environments in which household pets have access to the lawn. In particular, when pets eliminate (i.e., urinate or defecate) on grassy areas, nitrogen from the urine or feces tends to disperse into the soil in high concentrations around the area where the pet has eliminated. The result may be unsightly "burn spots" in the lawn where the pet has deposited the waste product. The challenge can be most severe when female large-breed dogs urinate, due to the squatting posture that female dogs tend to use when they urinate and the relatively fast dispersion rate of nitrogen in liquid form. While certain techniques, such as dietary supplements and "scarecrow" solutions, can be attempted to address this concern, these techniques may have provided limited, if any, improvement. For example, dietary supplements that attempt to reduce the amount of nitrogen in the pet's waste may be harmful to the pet's health, and scarecrow solutions that attempt to frighten away pets with water and/or sound, can be simply ignored by the pet.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the present invention provide for an irrigation system having a water distribution system, a controller and a pet monitoring system. The controller may modify an irrigation setting of the water distribution system based on a pet elimination signal from the pet monitoring system.

Embodiments of the present invention also provide for a pet monitoring system having a collar, a wireless communication module coupled to the collar, and a pet elimination module coupled to the collar. The pet elimination module can generate a pet elimination signal in response to detection of a pet elimination event. The wireless communication module may transmit the pet elimination signal to an irrigation system controller.

Embodiments of the present invention also provide for a machine- or computer-readable medium having instructions stored thereon that, if executed cause an irrigation controller to receive a pet elimination signal from a pet monitoring system and modify a setting of a water distribution system based on the pet elimination signal.

Embodiments of the present invention also provide for a sprinkler head having a housing and an actuation assembly that controls the transfer of water through the housing. The sprinkler head may also include a radio frequency identifier (RFID) tag coupled, directly or indirectly, to the housing to uniquely identify the sprinkler head to a monitoring system. The monitoring system and an irrigation controller may use the RFID to determine where an elimination event has occurred.

Figure 1:
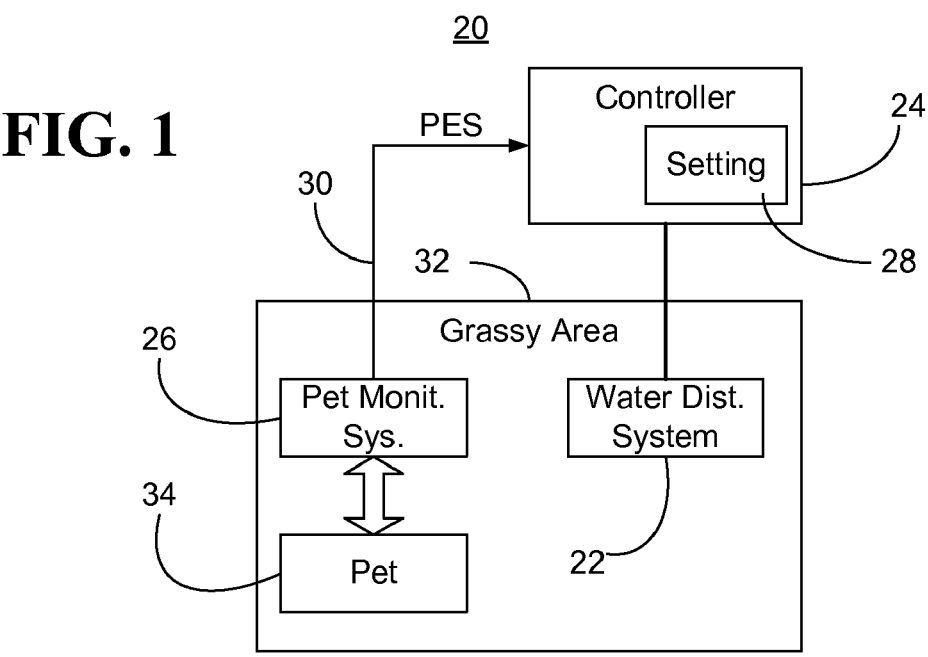
FIG. 1 is a block diagram of an example of an irrigation system according to an embodiment of the present invention.

FIG. 1 shows an irrigation system 20 having an in-ground or above ground water distribution system 22, a controller 24 and a pet monitoring system 26. In general, the controller 24 may be mounted indoors or outdoors, and can control the manner in which the water distribution system 22 delivers water to a grassy area 32 that is accessible by an animal/pet 34. Irrigation controller technology is well defined and certain aspects will not be described in greater detail so as not to obscure more relevant aspects of the embodiments of the invention. The area 32 may be, for example, a residential area such as a back yard lawn, a common area such as a recreational park, or a commercial landscape. In addition, the pet 34 may be any type of animal, domesticated or undomesticated, whose activity may be tracked. Control of the water distribution system 22 can be implemented through manipulation of various settings such as irrigation setting 28. The irrigation setting 28 may be a timing setting, a volume setting, etc., stored in memory such as random access memory (RAM), programmable read only memory (PROM), flash memory, etc., of the controller 24. In particular, the illustrated controller 24 modifies the irrigation setting 28 of the water distribution system 22 based on a pet elimination signal (PES) 30 from the pet monitoring system 26, wherein the PES 30 corresponds to a pet elimination event such as urination or defecation. By increasing the amount of water delivered to the area 32, or portions thereof, in response to elimination events, the illustrated irrigation system 20 is able to disperse nitrogen from waste products into the soil more rapidly and significantly reduce the occurrence of burn spots.

Figure 2:
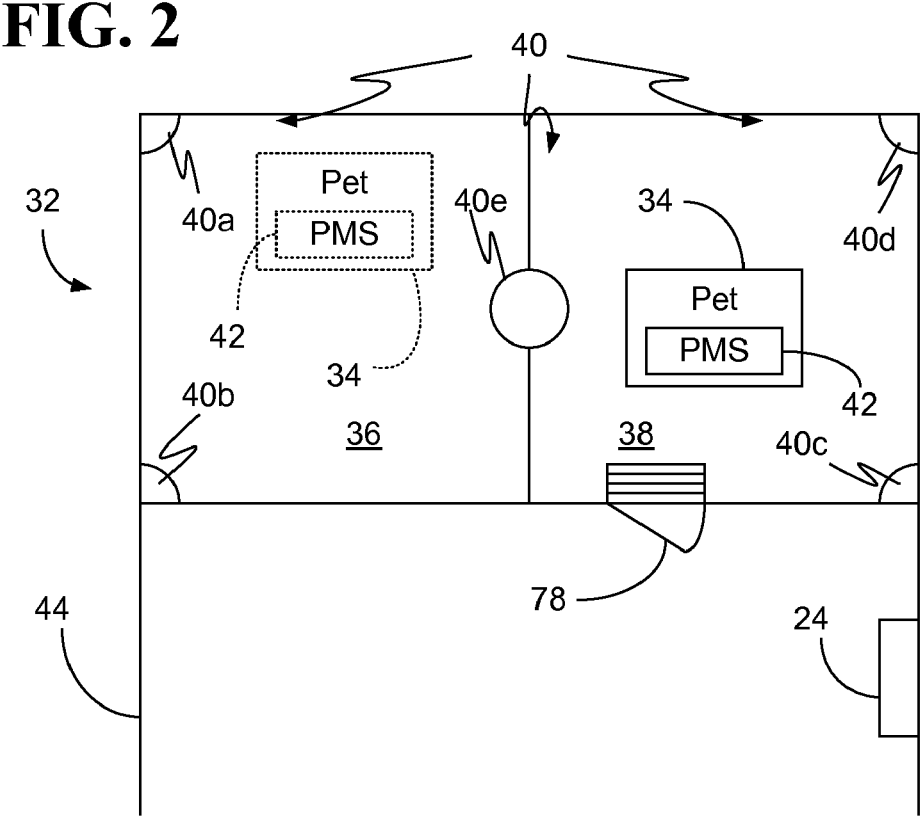
FIG. 2 is a diagram of an example of a pet-mounted pet monitoring system and a plurality of zones serviced by a water distribution system according to an embodiment of the present invention.

Turning now to FIG. 2, a more detailed example of a house 44 having a grassy area 32 that is logically partitioned into a plurality of zones including a first zone 36 and a second zone 38, is shown. In this example, the water distribution system includes a plurality of lawn sprinkler heads 40 (40a-40e), which deliver water to various portions of the area 32 as instructed by the controller 24. The sprinkler heads 40 can have pop-up actuation assemblies that enable the sprinkler heads 40 to be flush with or beneath the surface of the soil when they are not distributing water. Alternatively, the sprinkler heads 40 could be above ground sprinklers that are readily movable throughout the area 32. The sprinkler heads 40 may also have a wide variety of architectures such as rotor, spray and drip architectures based on the needs of the landscape. In the illustrated example, heads 40a-40d are set to a 90° rotation and head 40 is set to a 360° rotation. The sprinkler heads 40 may be generally assigned to one or more of the zones 36, 38 based on the placement and characteristics of the sprinkler head and the irrigation needs of the particular zone.

For example, sprinkler heads 40a, 40b and 40e may be used to water the first zone 36, and sprinkler heads 40c, 40d and 40e may be used to water the second zone 38. In the illustrated example, the pet 34 is permitted to travel throughout the area 32 and a pet-mounted pet monitoring system (PMS) 42 is used to detect pet elimination events and communicate the occurrence of these events back to the controller 24 in the form of pet elimination signals. For example, the PMS 42 might detect a urination event in the second zone 38, and wirelessly transmit a corresponding PES to the controller 24. The illustrated controller 24 uses the PES to select the second zone 38 from the plurality of zones and to increase the amount of water delivered to the selected second zone 38. By singling out portions of the area 32 for the delivery of increased amounts of water (and effectively bypassing portions of the area 32 not in need of increased amounts of water), the irrigation system may enable greater conservation of water and reduction of costs associated with water delivery, while at the same time ensuring an attractive and "burn spot" free lawn.

Figure 3A:
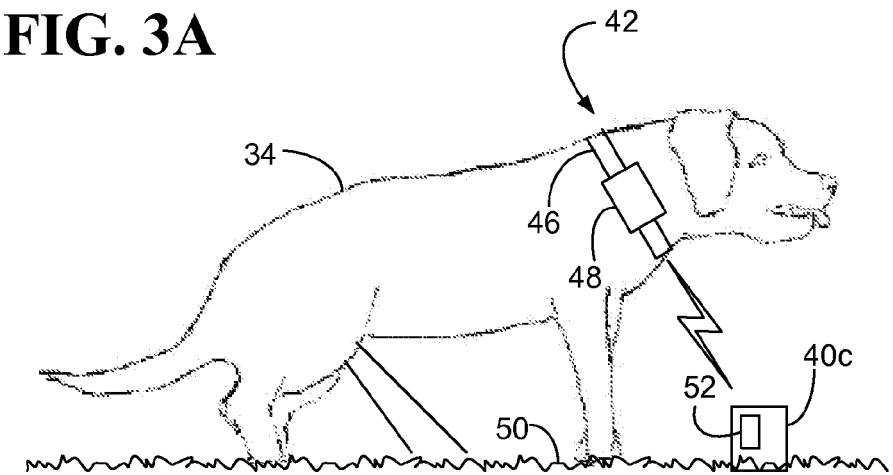
FIG. 3A is an illustration of an example of an animal during an elimination event according to an embodiment of the present invention.

FIG. 3A shows an example of the pet-mounted PMS 42 being used to detect a pet urination event. In particular, the pet 34 may be equipped with a collar 46 and a housing 48 that includes electronics capable of determining that the pet 34 has urinated on grass 50. The electronics within the housing 48 may also be able to identify one or more nearby sprinkler heads such as sprinkler head 40c. In the illustrated example, the sprinkler head 40c includes a radio frequency identifier (RFID) tag 52, which is read by the electronics within housing 48. RFID technology is well defined and will not be described in greater detail so as not to obscure more relevant aspects of the embodiments of the invention. Notwithstanding, the range of the RFID system may be set to provide a level of sensitivity that is commensurate with the layout of the sprinkler head network and the throughput parameters of the water distribution system. For example, a sensitivity of a few feet may be sufficient to ensure that at least one sprinkler head is detected for each pet elimination event, and that increasing the activation time for the zone associated with the detected sprinkler head(s) will result in a saturation of the impacted turf.

Figure 3B:
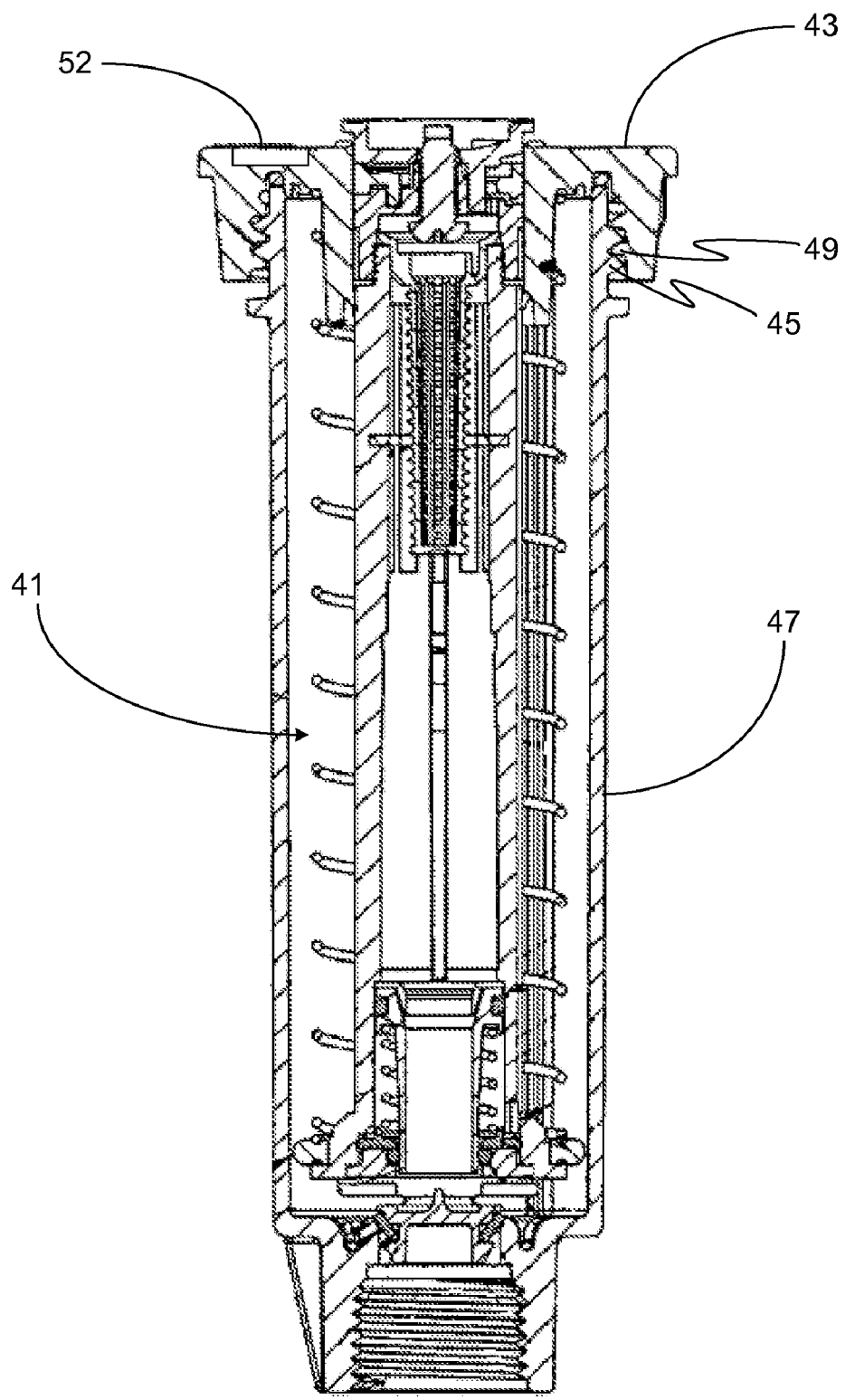
FIG. 3B is an enlarged view of an example of a sprinkler head according to an embodiment of the present invention.

FIG. 3B demonstrates that the RFID tag 52 may be molded within or otherwise coupled to a housing 47 of the sprinkler head 40c, wherein the sprinkler head 40c may also include a well known actuation assembly 41 that controls the transfer of water through the housing 47. In particular, the illustrated RFID tag 52 is molded into a sprinkler cover 43 that is mounted by inter-engaging sets of housing threads 45 on the upper end of the housing 47 and cover threads 49 on the cover 43. The cover 43 may have a central opening through which an elongated, hollow cylindrical pop-up riser is movable between a retracted position and an elevated spraying position. Incorporating the RFID tag 52 into a removable component such as the cover 43 enables pre-existing irrigation systems to be readily retrofitted to function as described herein.

The pet elimination event may generally be detected in a number of ways. For example, it has been determined that pets typically eliminate when they are first let outside and do not move while urinating or defecating. Thus, a monitoring period $P_M$ can be established to define the amount of time (say, 5 minutes) after the pet enters the grassy area 32 (FIG. 2) during which the pet's motion will be monitored. An idleness period $P_i$ can also be established to define the amount of time for which the pet must be stationary before a pet elimination event may be inferred. Thus, by monitoring the pet's movement and detecting when the pet 34 (FIG. 3A) has remained stationary for a predetermined amount of time, the PMS 42 (FIG. 3A) can generate appropriate pet elimination signals. Another approach may be to take into consideration the posture of the pet 34 (FIG. 3A) during the monitoring period $P_M$. For example, it has also been determined that pets (particularly female) may squat when urinating. Thus, by monitoring the pet's posture (using a harness with tilt sensors, for example), the PMS 42 (FIG. 3A) can also generate appropriate elimination signals. Other behavioral characteristics and/or observations may also be used as a basis to detect pet elimination events.

Figure 4:
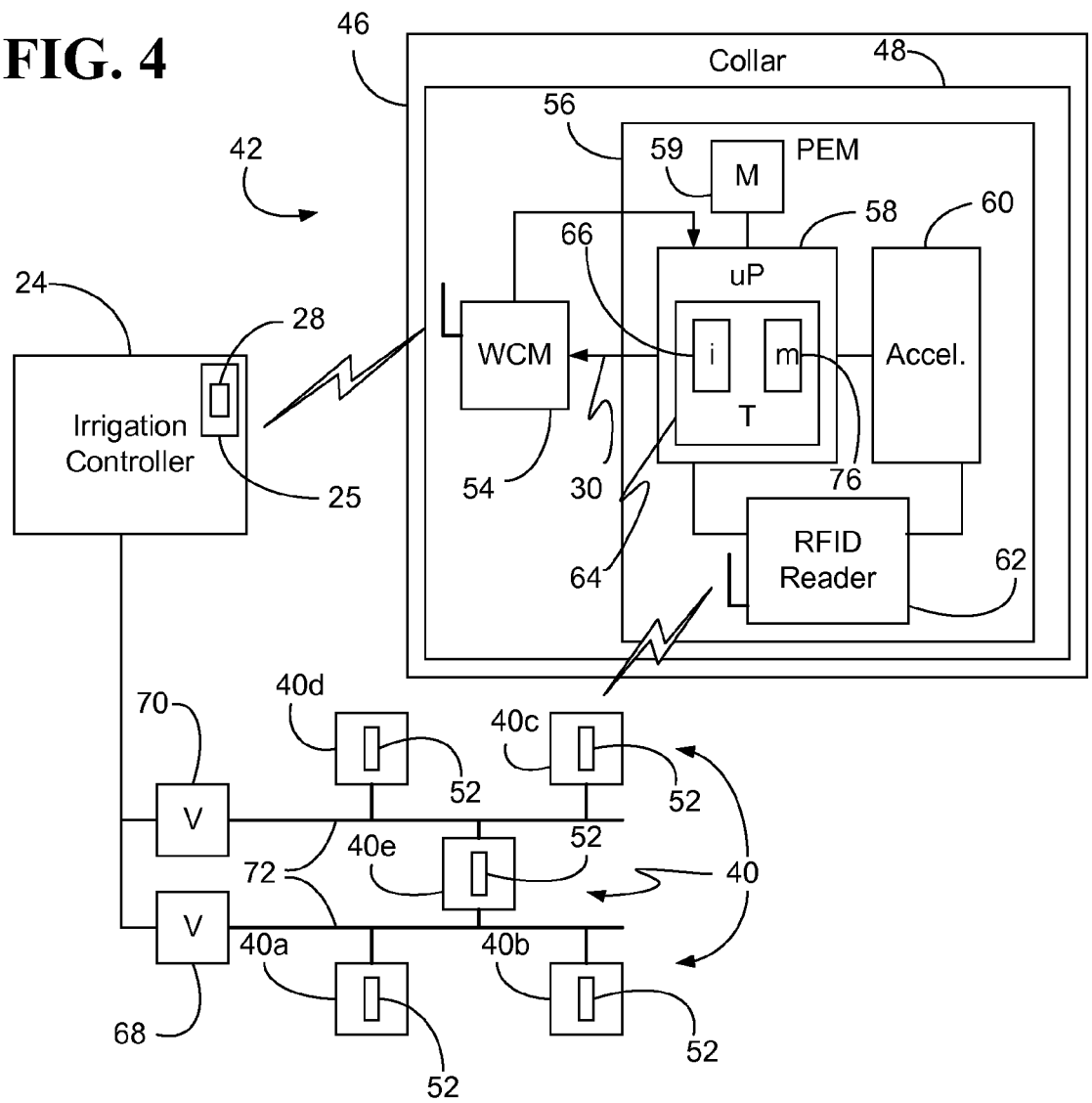
FIG. 4 is a diagram of an example of a pet-mounted pet monitoring system according to an embodiment of the present invention.

Turning now to FIG. 4, an example of the pet-mounted PMS 42 is shown in greater detail. The illustrated water distribution system includes a plurality of valves 68, 70 corresponding to zones 36, 38 (FIG. 2), respectively, a plurality of sprinkler heads 40 and a conduit network 72 coupled to the valves 68, 70, and the sprinkler heads 40. The valves 68, 70 may alternatively be incorporated into the controller 24, depending upon the circumstances. In addition, the conduit network 72 may be made up of one or more underground conduits or above ground hoses. As already discussed, the sprinkler heads 40 can be equipped with RFID tags 52 to uniquely identify the corresponding sprinkler head 40 to the irrigation system. In one example, each RFID tag 52 may be registered with the controller 24 prior to, during, or after installation or placement of the sprinkler heads 40. When the sprinkler heads 40 are assigned to the respective zones, the associated RFIDs may also be included in the process. The registration information, as well as irrigation settings such as setting 28, may be stored to memory 25 such as RAM, ROM, PROM, flash memory, etc. of controller 24.

The PMS 42 may include the collar 46, a wireless communication module (WCM) 54 and a pet elimination module (PEM) 56. In the example shown, the PEM 56 generates the PES 30 in response to detection of the pet elimination event near sprinkler head 40c, and the WCM 54 transmits the PES 30 to the controller 24, wherein the PES 30 may include an indication of the tag 52 associated with the sprinkler head 40c. In response to the PES 30, the illustrated controller 24 determines that the sprinkler head 40c belongs to the second zone 38 (FIG. 2) and increases the activation time of valve 70, which supplies the second zone 38 (FIG. 2) and feeds into the sprinkler head 40c.

In particular, the illustrated PEM 56 includes a microprocessor (uP) 58, memory 59, an accelerometer 60 and an RFID reader 62. The microprocessor 58 may include and/or execute timer logic (T) 64 that begins a monitoring period $P_M$ by incrementing a monitoring counter 76 in response to an initiation trigger signal (discussed in greater detail below), which may be received from a component such as the controller 24 or a stand-alone triggering device. The initiation trigger signal may generally correspond to the pet 34 entering the lawn serviced by the irrigation system. During the period $P_M$, the illustrated timer logic 64 also increments an idleness counter 66 when the accelerometer 60 indicates that the collar 46 is stationary. If the idleness counter 66 reaches predetermined threshold ($P_i$), the illustrated RFID reader 62 identifies one or more nearby sprinkler heads 40 such as the sprinkler head 40c. The timer logic 64 and data for the PES 30 may be stored in and retrieved from memory 59.

The WCM 54 and controller 24 can communicate using a wide variety of wireless communication techniques such as WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), spread spectrum (e.g., 900 MHz) and other radio frequency (RF) telephony techniques, depending upon the circumstances. Indeed, for pre-existing irrigation systems, the WCM 54 could be equipped with the same wireless functionality of other components of the system, such as wireless rain sensors. In addition, the PES 30 may be transmitted to the controller 24 instantaneously or at a later time (e.g., when the pet re-enters the house).

Figure 5A:
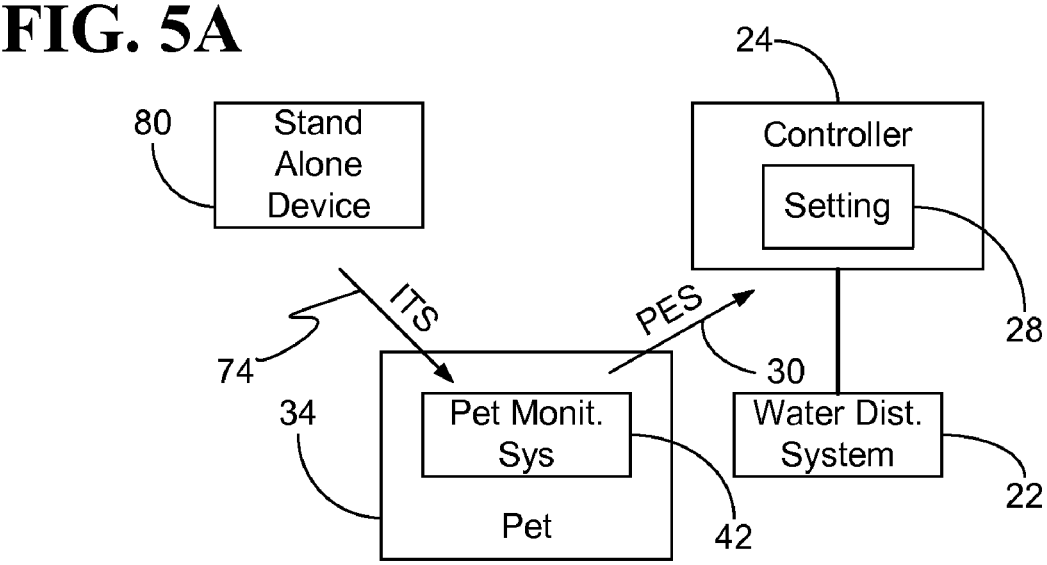
FIGS. 5A-5D are block diagrams of examples of triggering schemes according to embodiments of the present invention.
Figure 5B:
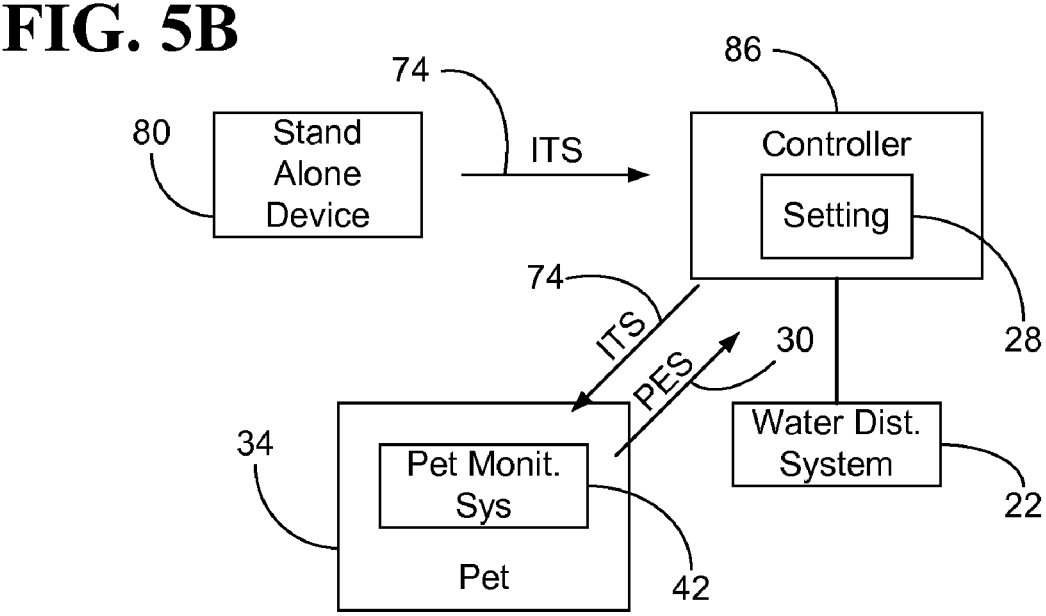
Figure 5C:
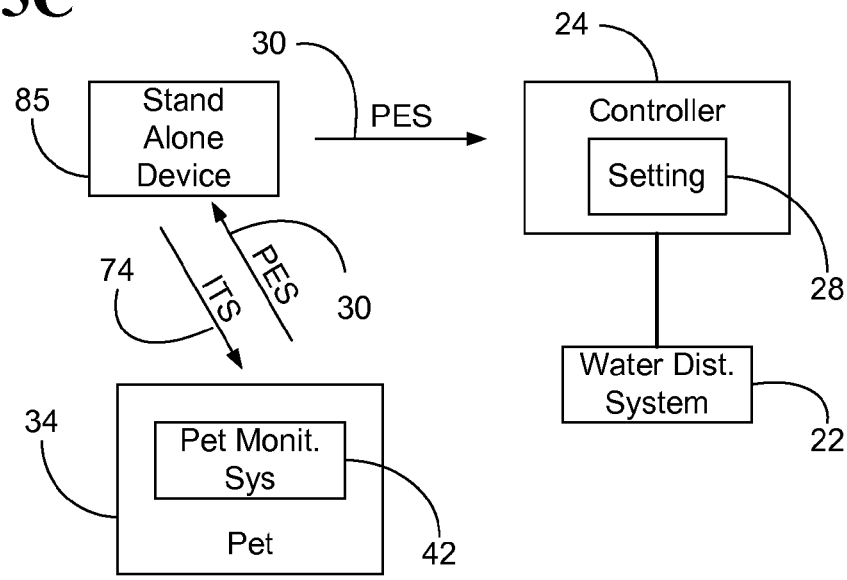
Figure 5D:
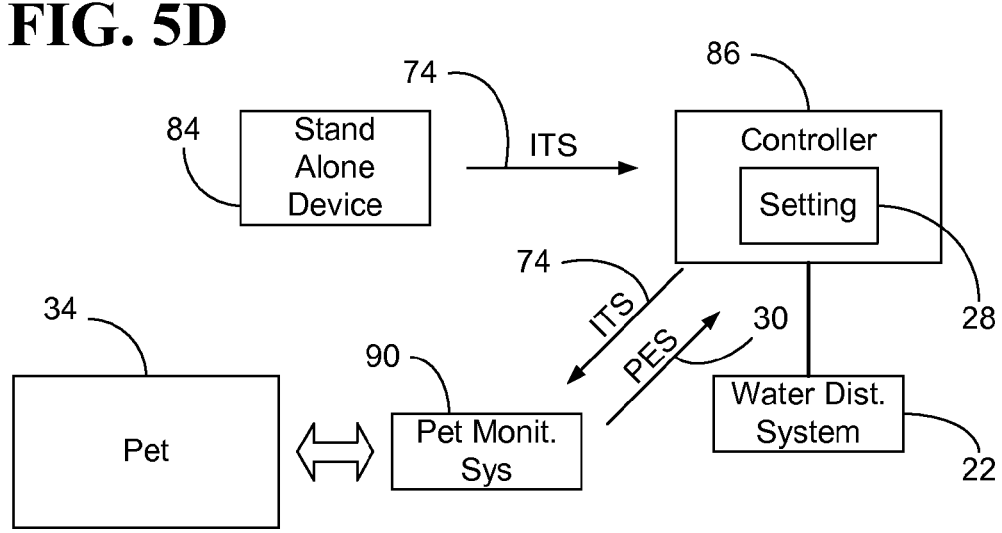
Figure 6A:
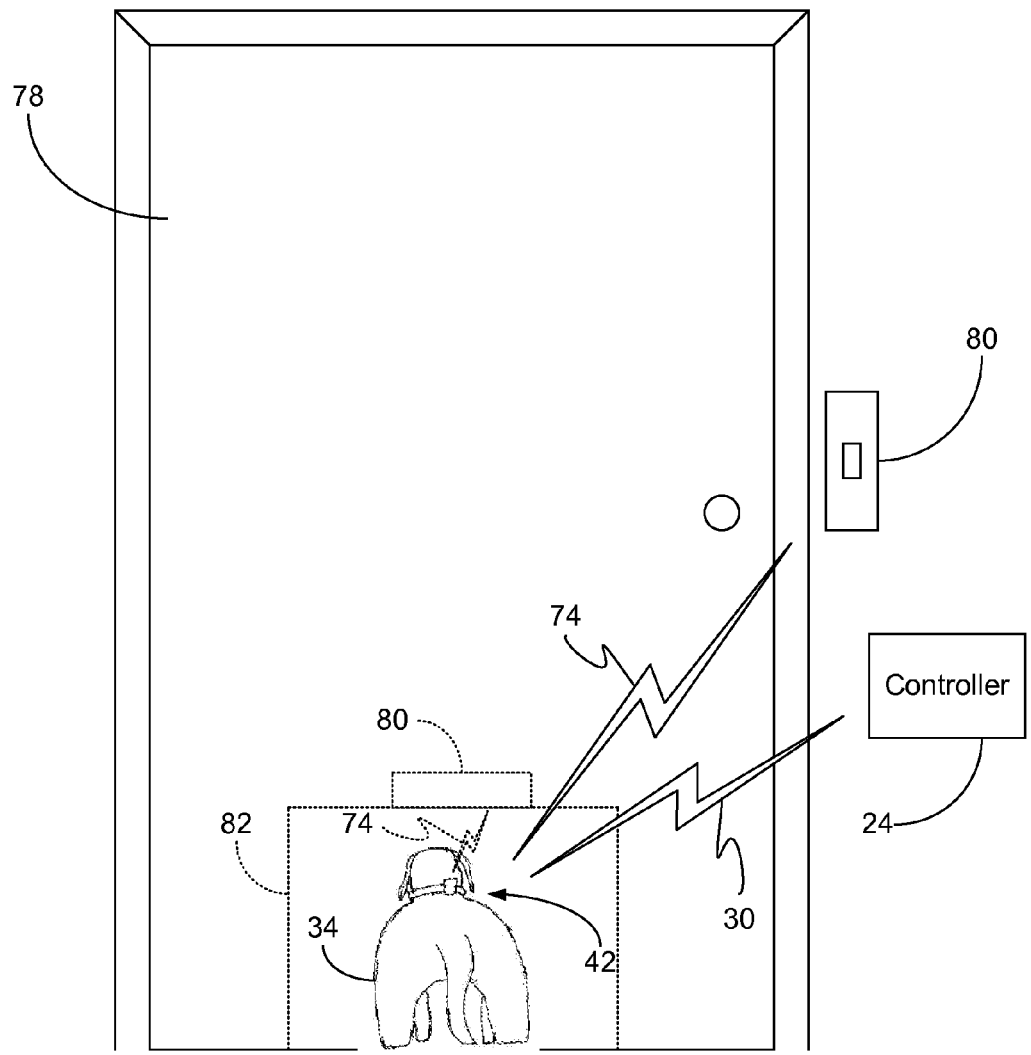
FIG. 6A-6D are illustrations of examples of the triggering schemes shown in FIGS. 5A-5D, respectively.

FIGS. 5A-5D and 6A-6D generally show numerous schemes that may be used to initiate pet monitoring and report detected pet elimination events. In particular, FIGS. 5A and 6A illustrate a pet 34 exiting a house 44 (FIG. 2) through doorway 78. A stand-alone triggering device 80 may be mounted near the doorway 78, wherein an individual letting the pet 34 outside may press a button or other interface of the triggering device 80 when the pet exits in order to generate the initiation trigger signal (ITS) 74. The illustrated ITS 74 is transmitted wirelessly to the pet-mounted pet monitoring system 42, which begins the monitoring period $P_M$ in response to the ITS 74. Upon detection of the pet elimination event, the pet monitoring system 42 may wirelessly transmit the PES 30 to the controller 24. Alternatively, the doorway 78 may be equipped with a smaller pet door 82, wherein triggering device 80 may be mounted adjacent to the pet door 82. In such a configuration, the triggering device 80 may include one or more sensors that automatically detect the pet 34 passing through the pet door 82. Upon such detection, the triggering device 80 may also automatically transmit the ITS 74 to the pet monitoring system 42.

Figure 6B:
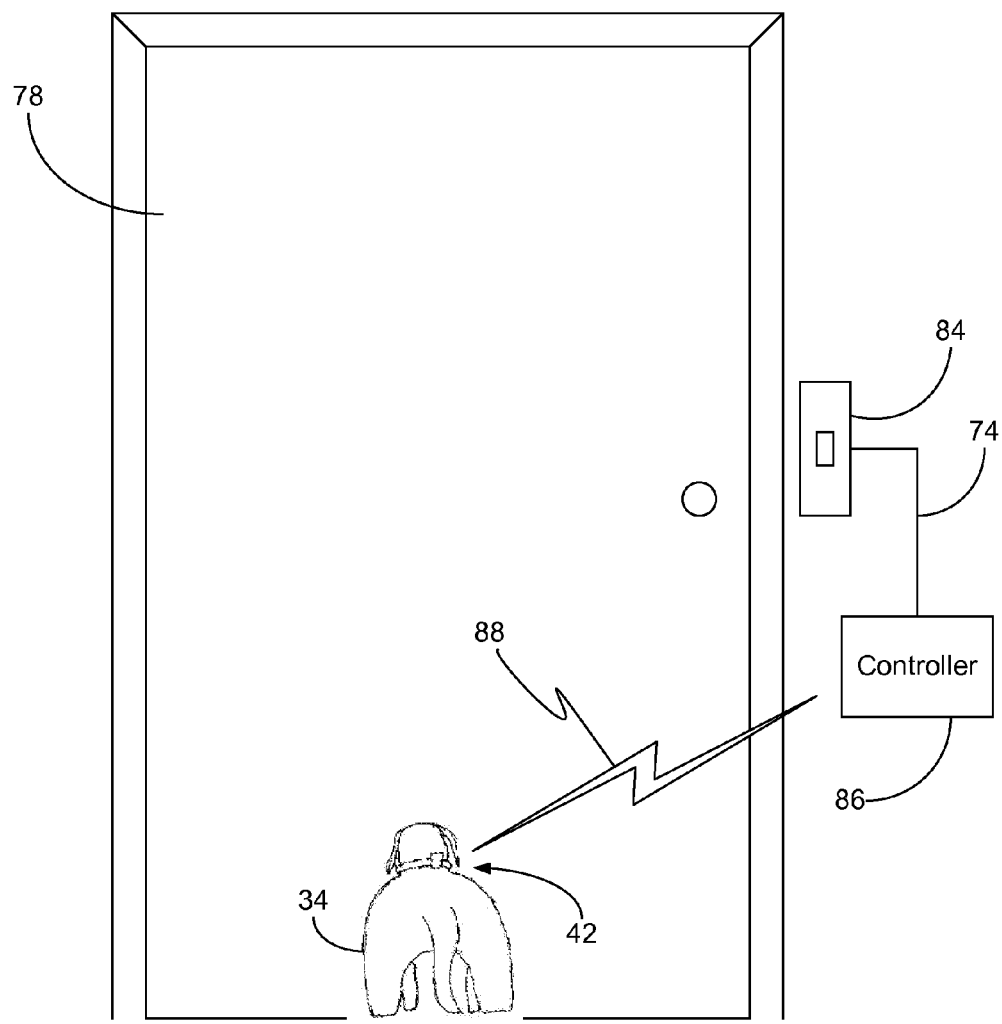

FIGS. 5B and 6B illustrate a configuration in which a stand-alone triggering device 84 sends the ITS 74 to an irrigation controller 86, which forwards the ITS 74 to the pet-mounted pet monitoring system 42 via wireless link 88. Upon detection of the pet elimination event (or at a later time), the pet monitoring system 42 may transmit the PES to the controller 86 via the wireless link 88. In the illustrated example, the triggering device 84 communicates with the controller 86 via a wired connection such as an RS-232 (Electronic Industries Alliance/EIA), Ethernet (e.g., IEEE 802.3-2005, LAN/MAN CSMA/CD Access Method), power line communication (e.g., X10, IEEE P1675), or USB (e.g., Universal Serial Bus 2.0 Specification) connection. Alternatively, the triggering device 84 may communicate with the controller 86 via a wireless link.

Figure 6C:
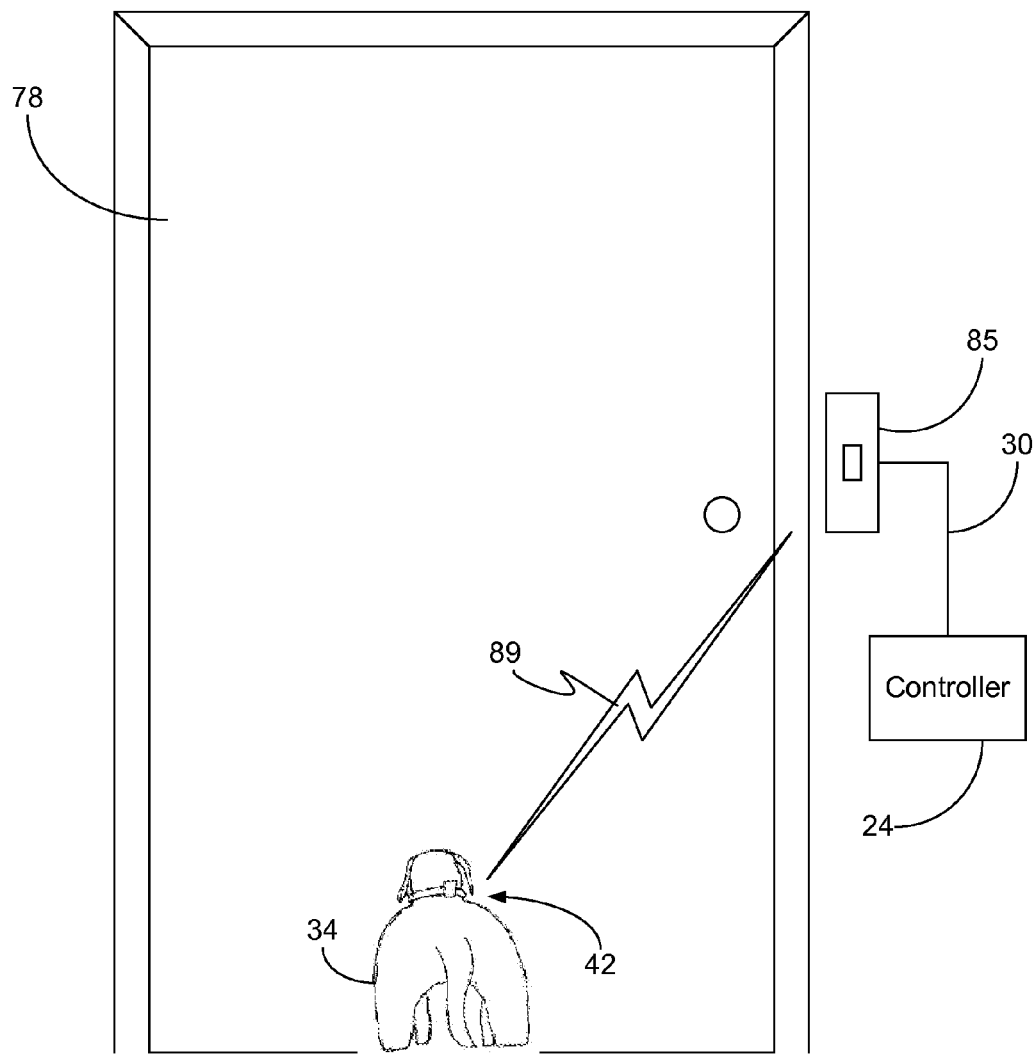

FIGS. 5C and 6C demonstrate that a stand-alone triggering device 85 may send the ITS 74 to the pet monitoring system 42 and receive the PES 30 from the pet monitoring system 42 via a wireless link 89 (perhaps when the pet re-enters the house). The use of the triggering device 85 to collect the PES 30 may facilitate the use of a short range wireless link, which can be more cost effective. The triggering device 85 can then forward the PES 30 to the controller 24 via a wireless or wired communication link.

Figure 6D:
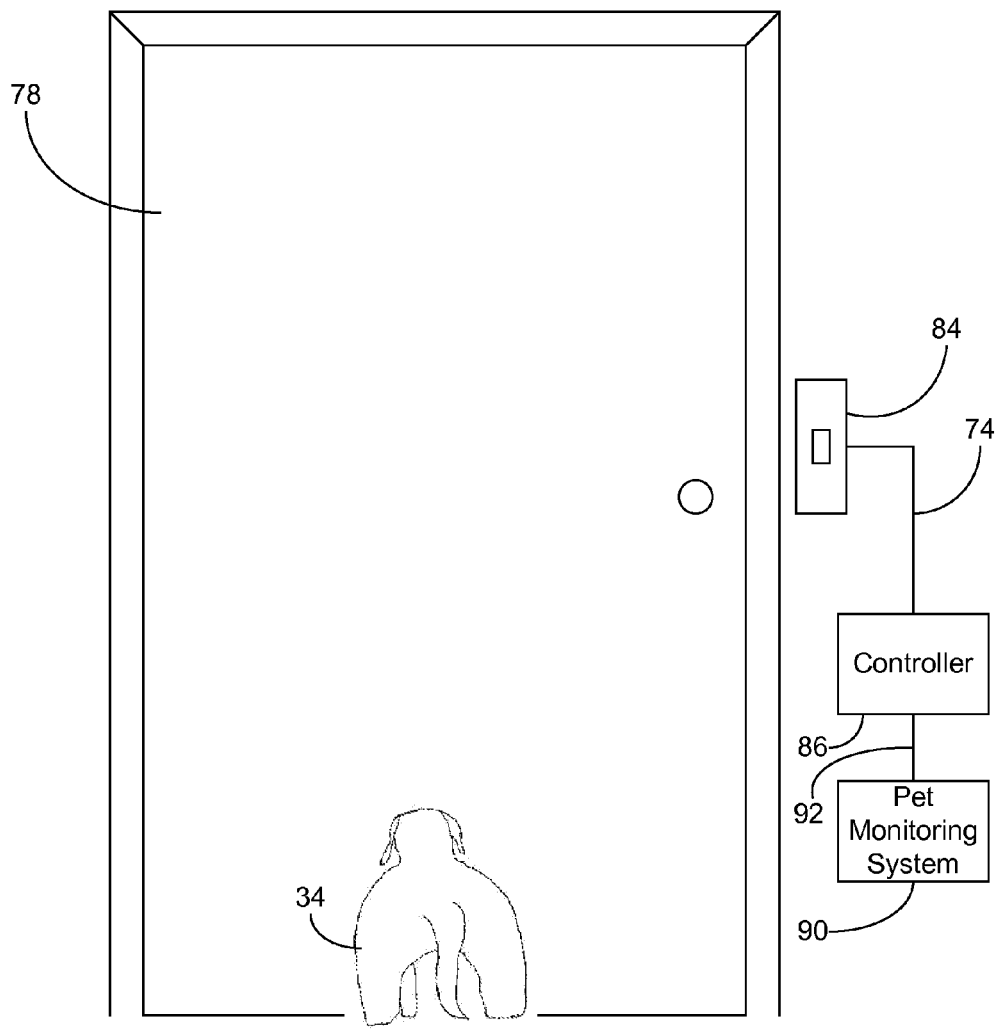

Turning now to FIGS. 5D and 6D, a scheme employing a pet monitoring system 90 that includes a perimeter motion detection configuration rather than a pet-mounted configuration. In the illustrated example, the stand-alone triggering device 84 sends the ITS 74 to the controller 86, which forwards the ITS 74 to the pet monitoring system 90 via a wired connection 92. Upon detection of the pet elimination event, the pet monitoring system 90 may transmit the PES 30 to the controller 86 via the wired connection 92. Alternatively, the pet monitoring system 90 may communicate with the controller 86 via a wireless link.

Figure 7:
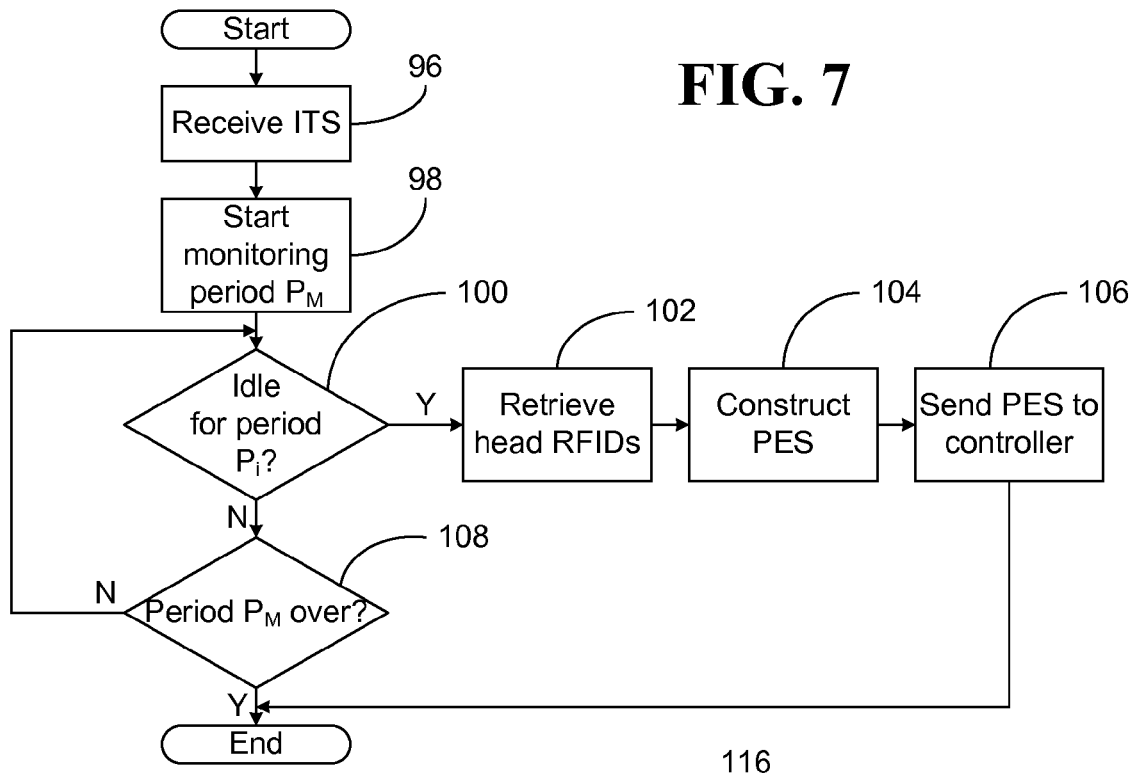
FIG. 7 is a flowchart of an example of a method of generating a pet elimination signal according to an embodiment of the present invention.

FIG. 7 shows a method 94 of generating a pet elimination signal. The method 94 may generally be implemented in executable software as a set of logic instructions stored in a machine- or computer-readable medium of a PMS memory 59 (FIG. 4) such as RAM, ROM, PROM, flash memory, etc., in fixed-functionality hardware of a PMS using technology such as application specific integrated circuit (ASIC), complementary metal oxide semiconductor (CMOS) or transistor-transistor logic (TTL) technology, or any combination thereof.

In particular, the illustrated processing block 96 provides for receiving an initiation trigger signal (ITS). As already noted, the ITS may be received from an irrigation controller, a stand-alone triggering device, or any other suitable triggering source. A monitoring period $P_M$ is started at illustrated block 98 and block 100 may provide for determining whether an idleness period P, has expired during the monitoring period $P_M$. If so, nearby sprinkler head RFIDs may be retrieved and stored at block 102, and a pet elimination signal may be constructed at block 104. In this regard, the pet elimination signal can be constructed into a simple packet containing an indication of the nearby sprinkler heads (e.g., head_1, head_2), an indication of the type of elimination event (e.g., "1" for urination, "0" for defecation), and a timestamp indicating the time and/or date of the elimination event. The PES may be sent to the irrigation controller at block 106 for processing. Illustrated block 108 provides for determining whether the monitoring period $P_M$ has expired if the idleness period $P_i$ has not expired. If not, the idleness check at block 100 may be repeated as needed.

Figure 8:
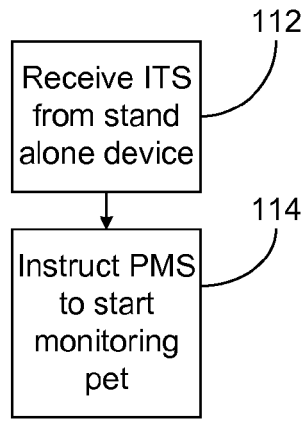
FIG. 8 is a flowchart of an example of a method of triggering a pet monitoring system according to an embodiment of the present invention.

Turning now to FIG. 8, a method 110 of initiating a monitoring period is shown. The illustrated example can correspond to the examples shown in FIGS. 5B, 5C, 6B, 6C, wherein the irrigation controller 86 may use the method 110 to participate in the triggering process. Thus, the method 110 may generally be implemented in executable software as a set of instructions stored in a machine- or computer-readable medium of a controller such as RAM, ROM, PROM, flash memory, etc., in fixed-functionality hardware of a controller using technology such as ASIC, CMOS or TTL technology, or any combination thereof. In particular, block 112 provides for receiving an ITS from a stand alone device, and block 114 provides for instructing a PMS to start monitoring a pet in response to the ITS. The instruction transmitted in block 114 may be a simple retransmission of the ITS received from the stand alone device, or may be re-formatted and/or re-packaged depending upon considerations such as the mode of operation and the link protocol between the controller and the PMS. The PMS may have a pet-mounted configuration, a perimeter-based configuration or any other suitable configuration.

Figure 9:
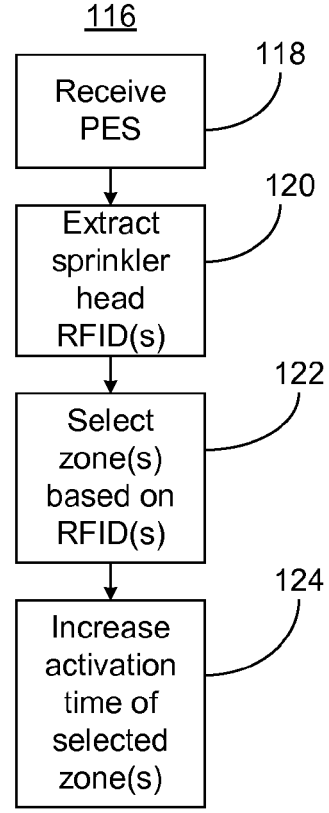
FIG. 9 is a flowchart of an example of a method of modifying a setting of a water distribution system according to an embodiment of the present invention.

FIG. 9 shows a method 116 of controlling a water distribution system. The method 110 may generally be implemented in executable software of a controller or other system component as a set of instructions stored in a machine- or computer-readable medium such as RAM, ROM, PROM, flash memory, etc., in fixed-functionality hardware of a controller or other system component using technology such as ASIC, CMOS or TTL technology, or any combination thereof. In particular, illustrated block 118 provides for receiving a pet elimination signal from a pet monitoring system. The pet elimination signal may be received directly from the pet monitoring system, or indirectly via a stand-along triggering device, Internet connection, or other interface or component. Illustrated block 120 provides for extracting sprinkler head RFIDs from the PES. The sprinkler head RFIDs may be matched to one or more zones serviced by the water distribution system, wherein the matched zones and/or corresponding valves can be selected at block 122. Block 124 provides for increasing the activation time of the selected zones and/or corresponding valves, which effectively increases the amount of water delivered to the selected zones. Other settings of the water distribution system may also be modified based on the PES. In addition, block 124 may take into consideration other factors, such as rain detection signals and other weather-related data, when determining whether to increase the activation time and by how much.

In particular, the amount of water to be added can be determined based on a number of factors such as the amount of water already scheduled to be delivered to the selected zone (which may be zero), the size of the selected zone, the flow rate of the water distribution system, the number of pet elimination events in the zone since the last watering (or rainfall), and the size, type and breed of the pet.

For example, the total activation time $T_A$ can be given by, $$T_A = \frac{V}{R}, \quad \text{Equation 1}$$

where V is the volume of water to be applied to the selected zone in gallons and R is the throughput for the selected zone in gallons per minute. The volume V may be given by, $$V = AC, \quad \text{Equation 2}$$

where A is the area of the selected zone in square feet and C is the pet elimination compensation in gallons per square foot. Thus, substituting for volume V yields, $$T_A = \frac{AC}{R}. \quad \text{Equation 3}$$

The throughput R can be calculated from the parameters of the water distribution system for the selected zone. In general, R may be given by, $$R = w_1 H_1 + w_2 H_2 + \ldots + w_n H_n, \quad \text{Equation 4}$$

where $H_i$ is the water throughput for sprinkler head i in gallons per minute and $w_i$ is the relative weight for the water from head i in relation to the selected zone. For example, a sprinkler head layout in which 100% of the water from heads 1 and 2 (e.g., heads 40a and 40b in FIG. 2) is delivered to a zone (e.g., zone 36 in FIG. 2), and 50% of the water from head 3 (e.g., head 40e in FIG. 2) is delivered to the zone, then the equation for R might be $H_1 + H_2 + 0.5 H_3$.

A scheduled activation time $T_S$, which represents the amount of time that the zone is already scheduled to be watered, may be subtracted from the total activation time $T_A$ to determine the amount of time that needs to be added to the scheduled activation time. Thus, the increased time $T_I$ may be given by, $$T_I = T_A - T_S. \quad \text{Equation 5}$$

Such a technique may in fact enable the use of a much more aggressive water conservation approach. For example, an irrigation schedule that activates the water delivery system three times per week, could be modified to activate the water delivery system only once or twice per week without concern over burn spots that may develop due to pet elimination activity. The cumulative water savings may therefore be substantial, particularly considering the benefits of widespread use of the above-described irrigation systems across geographic areas and over time.

Although the above discussion primarily focuses on scenarios in which zones are employed, the compensation techniques may also be applied to non-zone based solutions or where one or more zones is serviced by only a single sprinkler head. For example, each sprinkler head may be individually controlled (using dedicated valves, or wired or wireless technology) by the irrigation controller based on the sprinkler head identifier(s) in the pet elimination signals. In such a case, even greater water savings may be achieved.

Figure 10:
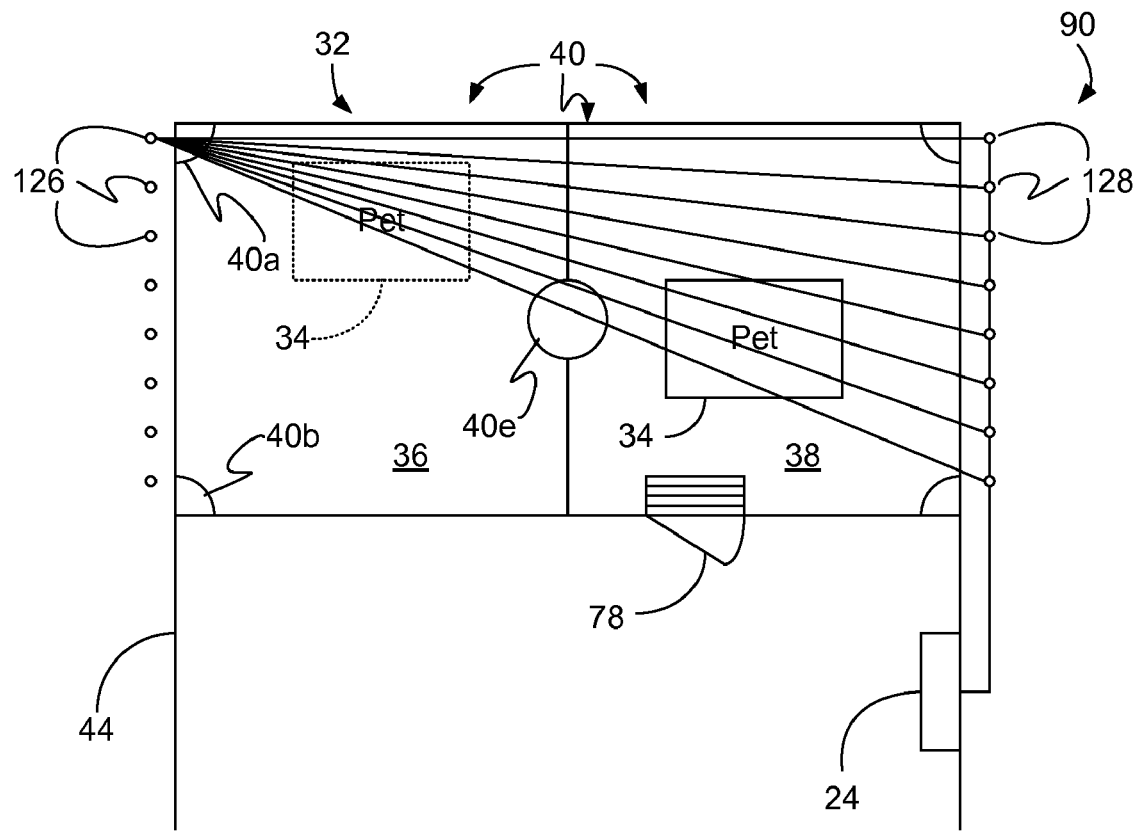
FIG. 10 is a diagram of an example of a perimeter-based pet monitoring system and a plurality of zones serviced by a water distribution system according to an embodiment of the present invention.

Turning now to FIG. 10, an alternate example of a house 44 having a grassy area 32 that is logically partitioned into a plurality of zones 36, 38 is shown. In this example, a pet monitoring system 90 includes a perimeter motion detection system having infrared (IR) transmitters 126 and receivers 128. The illustrated transmitters 126 are able to transmit IR beams to the receivers 128, which are configured to determine when one or more of the beams is interrupted. Based on the interruption of the beams, the pet monitoring system 90 may generate pet elimination signals, as already discussed. Other beam layouts and other non-IR-based motion detection schemes may be used. Any difficulty in distinguishing between pets and humans can be obviated with the triggering schemes already discussed. For example, the pet monitoring system 90 can be programmed to only track movement after receiving an initiation trigger signal.

The term "coupled" is used herein to refer to any type of relationship, direct or indirect, between the components in question, and may apply to electrical, mechanical, fluid, optical, electromagnetic, electromechanical or other connections.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A device comprising:
a first module configured to receive an input corresponding to a pet entering a grassy area; and
a second module generating an initiation trigger signal in response to the input, the initiation trigger signal instructing a monitoring system to detect an elimination event, wherein the elimination event is to be associated with a waste product deposition of a waste product by an animal.

2. The device of claim 1, wherein the second module includes a wireless communication module and the monitoring system is a pet-mounted monitoring system, the wireless communication module configured to transmit the initiation trigger signal to the pet-mounted monitoring system.

3. The device of claim 1, wherein the second module is configured to transmit the initiation trigger signal to an irrigation system controller that services the grassy area.

4. The device of claim 1, wherein the first module includes at least one of a proximity sensor and a user interface having a button.

* * * * *